United States Patent [19]

d'Auria et al.

[11] Patent Number: 4,529,986
[45] Date of Patent: Jul. 16, 1985

[54] OPTICAL CONNECTION SYSTEM FOR THE BIDIRECTIONAL EXCHANGE OF DATA BETWEEN A CENTRAL UNIT AND PERIPHERAL UNITS AND AN ELECTRONIC SWEEP ANTENNA COMPRISING SUCH A SYSTEM

[75] Inventors: Luigi d'Auria; Gérard Auvray; Bernard Desormiere, all of Paris, France

[73] Assignee: Thomson-CSF, Paris, France

[21] Appl. No.: 158,458

[22] Filed: Jun. 11, 1980

[30] Foreign Application Priority Data

Jun. 12, 1979 [FR] France .................. 79 14994

[51] Int. Cl.³ .................. G01S 5/04; H01Q 3/22
[52] U.S. Cl. .................. 343/433; 343/372; 343/853; 350/96.15
[58] Field of Search .................. 350/96.2, 96.15, 96.16; 250/227; 343/854

[56] References Cited

U.S. PATENT DOCUMENTS

| | | | |
|---|---|---|---|
| 3,953,857 | 4/1976 | Jenks | 343/705 |
| 4,027,945 | 6/1977 | Iverson | 350/96.2 |
| 4,193,661 | 3/1980 | d'Auria et al. | 350/96.16 |
| 4,277,134 | 7/1981 | Upton | 350/96.15 |

FOREIGN PATENT DOCUMENTS 2354668 5/1975 Fed. Rep. of Germany ...... 343/854

OTHER PUBLICATIONS

Antenne a Balayage Electronique Abeille by G. Albarel Revuetechnique Thomson–CSF, Mar. 1978.
3 Technical Publications by "Air Precision", 3-30-73.

Primary Examiner—Eli Lieberman
Attorney, Agent, or Firm—Oblon, Fisher, Spivak, McClelland & Maier

[57] ABSTRACT

A system for connection by means of optical fibers for the bidirectional exchange of data between a fixed central unit and peripheral units integral with a frame driven with a rotary movement, this system comprising radiating energy emitting and receiving means situated in the fixed part, coupled by optical fibers forming unidirectional data exchange paths to a single mixing fiber, itself coupled to optical fibers forming bidirectional data exchange paths coupled to radiating energy emitting and detecting means associated with the peripheral units integral with the mobile frame. Furthermore, the mixing fiber is split into two parts coupled together by a rotary optical joint.

8 Claims, 6 Drawing Figures

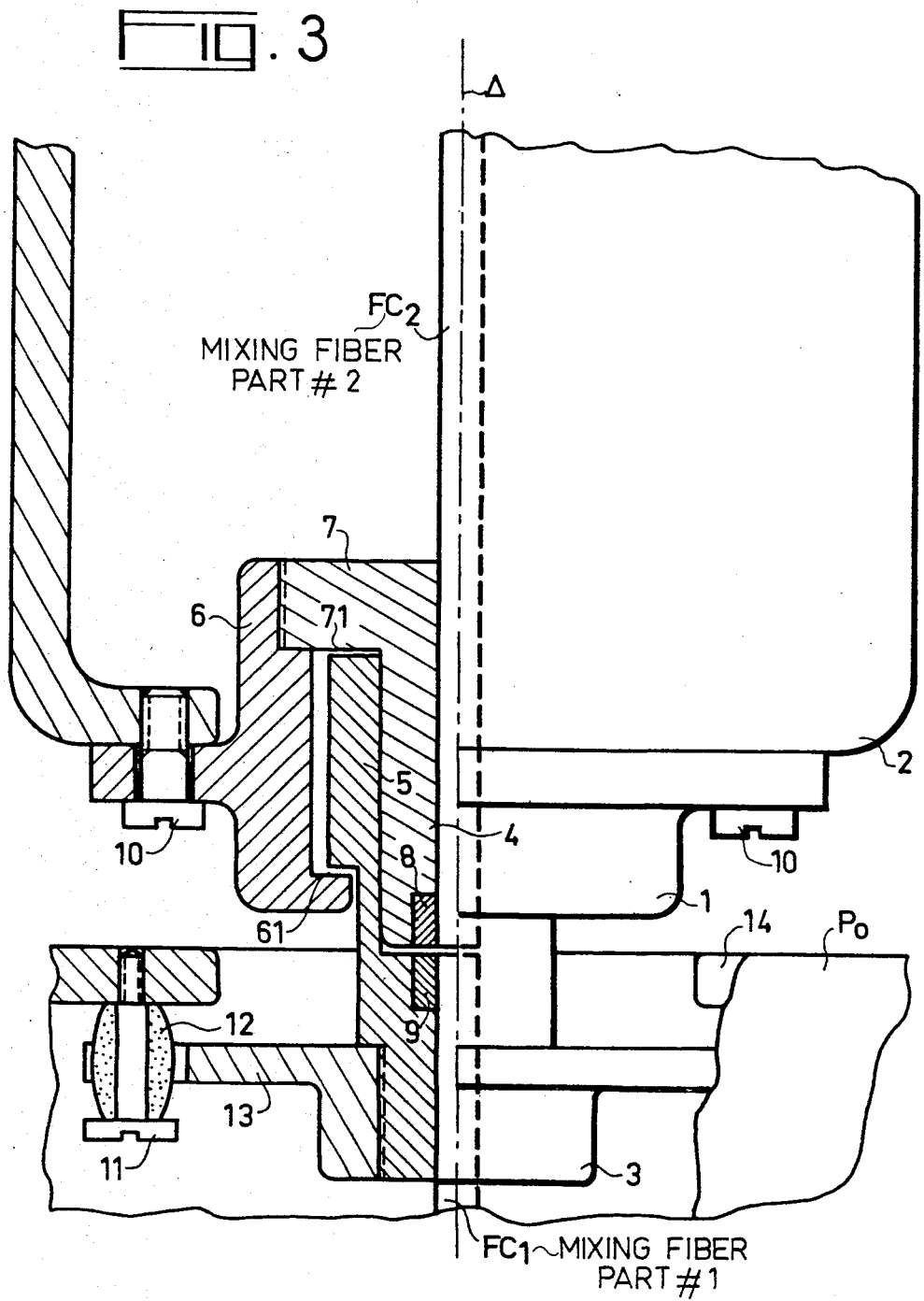

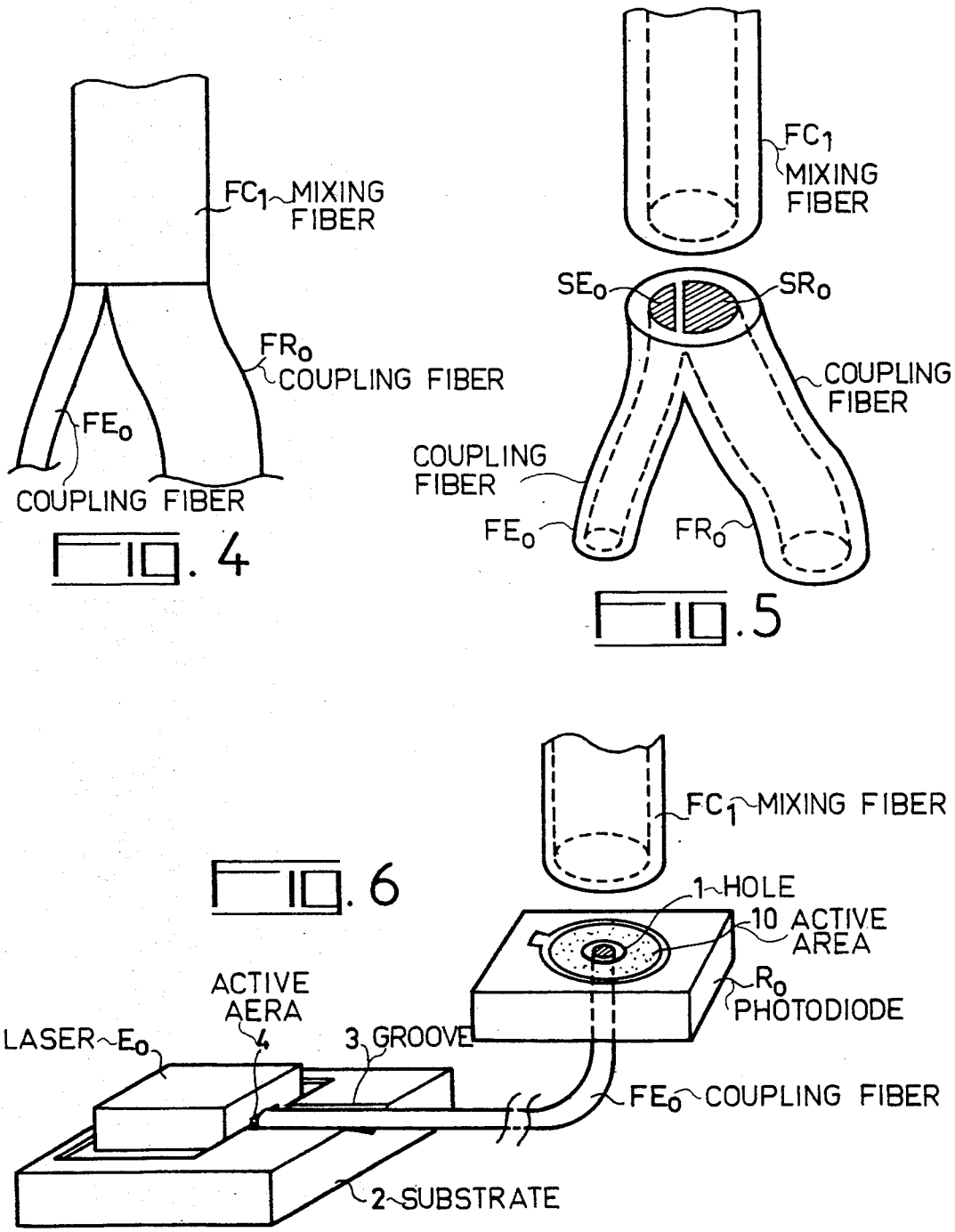

# OPTICAL CONNECTION SYSTEM FOR THE BIDIRECTIONAL EXCHANGE OF DATA BETWEEN A CENTRAL UNIT AND PERIPHERAL UNITS AND AN ELECTRONIC SWEEP ANTENNA COMPRISING SUCH A SYSTEM

BACKGROUND OF THE INVENTION

1. Field of the Invention

The present invention relates to an optical connection system for the bidirectional exchange of data between a central unit and peripheral units, and in particular peripheral units integral with a frame driven with a rotary movement.

2. Background of the Invention

The system of the invention applies more particularly to certain radar antennae of the electronic sweep type. For this type of antenna, there is associated with the mechanical rotation of the aerial an electronic deflection of the beam, in a cone having an axis perpendicular to the plane of the aerial and passing through its center. The electronic deflection is obtained by controlling the phase state of phase shift modules situated on the front face of the plane of the antenna. The order of size of the number of phase shift modules is about a thousand.

The phase of each pase shift module is computed, then displayed by an assembly of computing circuits situated on the rotary part of the antenna. The input data is elaborated by a central computer of the radar situated in the fixed part thereof. It is then necessary to transmit this information to the rotary part and to receive in return control information from the phase shift modules. These exchanges take place, according to the prior art, by means of a rotary joint comprising a ring collector and by means of electric connections. This ring collector is heavy and cumbersome because, besides rings intended for transmitting information signals, it contains power rings. Furthermore, numerous precautions must be taken to ensure the reliability of the transmissions:

contact by several brushes;

protection against oxidization so as to avoid contact defects if the antenna does not rotate for a period of time;

judicious distribution of the signal rings and the power rings on the collector, so as not to exceed the maximum common mode level of the line transmitters and receives used in the electric connections and, in the case of mechanical failure, so as to avoid the possibility of direct contact between the power rings and the wires conveying the information signals;

arrangments made for a good quality ground return.

All these precautions result, among other things, in limiting the possible flow of information exchange. The transmission rates are typically limited to 1 Mbit/s, the transmissions generally taking place by exchange of signals of the pulse type. This leads to splitting the communication paths into two :an "ascending" unidirectional path for the central computerperipheral unit connection and a "descending" unidirectional path for the reverse connection.

SUMMARY OF THE INVENTION

To palliate these disadvantages, the invention will propose a system of connections using optical fibers for the bidirectional exchange of data between the central computer and the assembly of computing circuits situated in the rotary part of the antenna. The use of optical connections has the advantage of making these connections insensitive to the interference and the "spitting" due to the power rings. Furthermore, mechancial failure of the collector cannot cause the destruction of the electronic circuits and the transmission rates may reach typically 10 Mbit/s.

The optical path connections furthermore, permit the use of, a particular architecture to be adopted which allows a different distribution of the electronic circuits between the rotary part and the fixed part of the antenna tending towards a simplification of the electronic circuits situated on the rotary part, which is much more accessible for adjustment and maintenance. Furthermore, the transmission rates permit the use of a main bidirectional transmission path.

The invention provides an optical connection system for the bidirectional exchange of data between a central unit and peripheral units comprising:

first optical fiber connecting members coupled to first radiating energy emitting and detecting members which are integral with the central unit;

shunting-mixing means for the bundle of optical fibers;

and second optical fiber connection members coupled to second radiating energy emitting and detecting members which are integral with the peripheral units.

The invention also provides an antenna with electronic sweeping of an electromagnetic wave emitted by an aerial driven with a rotary movement and comprising such an optical connection system.

DESCRIPTION OF THE DRAWINGS

Other features and advantages of the invention will appear more clearly from the following description and the accompanying figures in which:

FIGS. 3 to 6 illustrate details of the optical connection system of FIG. 2.

DESCRIPTION OF THE PREFERRED EMBODIMENTS

Figure 1:
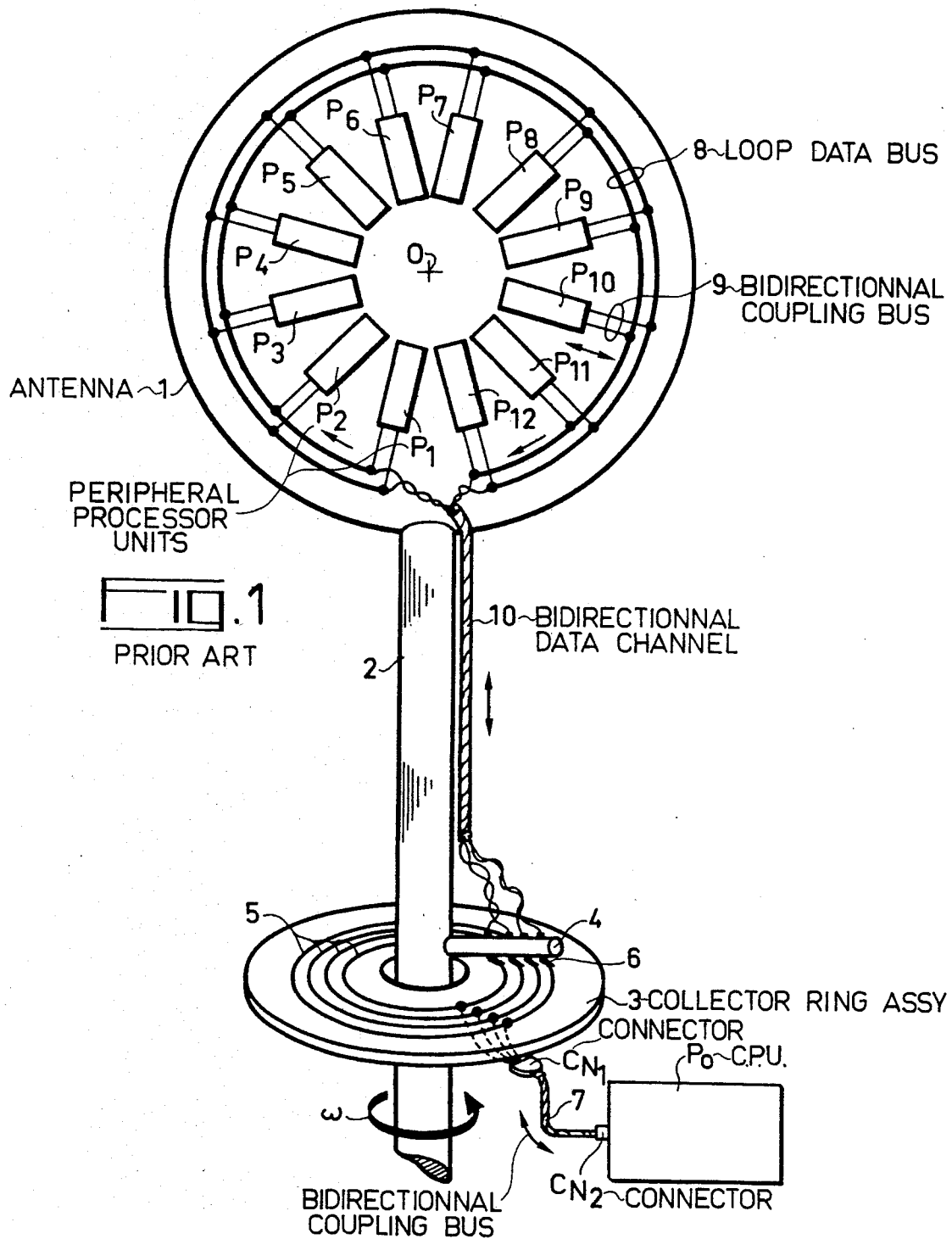
FIG. 1 illustrates an electronic sweep antenna of the prior art.

In FIG. 1 is a schematic of an electronic sweep antenna of the prior art. The antenna comprises essentially a mobile part, formed by the aerial 1 and its drive shaft 2, and a fixed part comprising, among other things, a central computer and a pointer, both under the general reference $P_0$. As is well-known, the aerial is driven with a rotary movement $\omega$ about axis 2. In this particular type of antenna, there is associated with the mechanical rotation of aerial 1 an electronic deflection of the beam, in a cone having an axis perpendicular to the plane of the antenna and passing through its center 0. For this, the phase state of phase shift modules (not shown) is controlled by means of an assembly of computing circuits integral with the rotary part of the antenna. In FIG. 1, these computing modules, twelve in number, are referenced $P_1$ to $P_{12}$.

These computing circuits hereafter called peripheral units, control then the phase state of about a thousand phase shift modules. A part of the computations required for determining the phase state is effected in a centralized way by central computer $P_0$. Connections may then be ensured, on the one hand, between this computer $P_0$ and the peripheral units $P_1$ to $P_{12}$ and, on the other hand, connections in the reverse direction for transmitting to the central computer $P_0$ control data coming from the peripheral units. The data required for the computation consist for example of three phase increment values (3 words of 16 bits).

This input data is calculated by the central computer of radar $P_0$ depending on the electronic deflection of the beam to be provided and on the transmitting frequency. It travels through an interface member, called a pointer, before being transmitted to the peripheral units. The connection is effected through connector $C_{N2}$, connections 7, connector $C_{N1}$, ring collector 3, and then to connections 10 and 8. The peripheral units $P_1$ to $P_{12}$ are coupled in parallel by connections 9 to bus connections 8. Ring collector 3 comprises a fixed part provided with tracks 5 or signal rings and a mobile part 4 integral with the axis of rotation 2 comprising sliding contacts 6. Power rings for feeding the aerial with energy have not been shown in FIG. 1. A judicious distribution between signal rings 5 and these power rings must however be ensured for proper operation of the assembly and particularly for minimizing any risk of damage to the electronic circuits connected to the signal connections.

The connections between the central computer $P_0$ and the peripheral units $P_1$ to $P_{12}$ are made by means of two-wire lines associated with line transmitters and receivers satisfying pre-established norms, for example norms E I A R S 422. As a measure of precaution, for the reliability of the connections, the transmission speed is limited to about 1 Mbit/s. This leads typically to adopting a bus-structure three-screened-pair redundant connection, the twelve computing boxes being connected to this bus 8 by means of connections 9.

From the computer, via the pointer, the same information is transmitted in parallel to the twelve computing boxes. This information comes back to the pointer for verification of proper transmission. Furthermore, test information elaborated by the peripheral units must be transmitted to the pointer and to the central computer. A single computing box at one and the same time feeds this information to the computer.

Different processes well-known to one skilled in the art may be used for ensuring correct exchange procedure of the conversational type and will not be described further. These procedures are aimed particularly at ensuring multiplexing in correct time.

Although currently used, the electric-path exchange system which has been described presents the disadvantages which were mentioned above. The present invention will allow to a large extent the limitations inherent in this electric-path connection system to be surmounted.

The optical connection system of the invention will now be described with reference to FIGS. 2 to 5.

Figure 2:
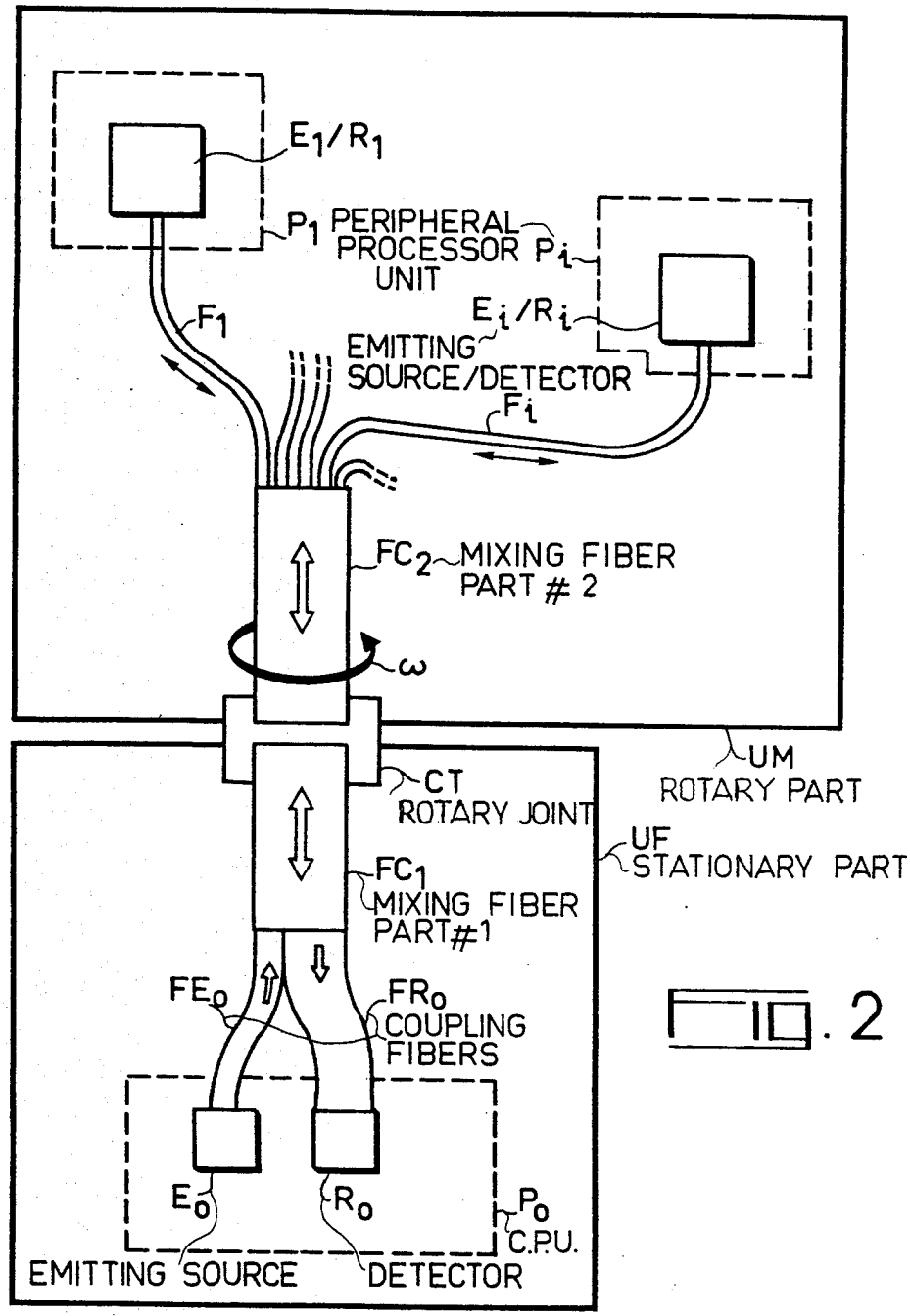
FIG. 2 illustrates a bidirectional optical connection system in acccordance with the invention.

FIG. 2 illustrates the architecture of the optical connection system of the invention. The system is divided into two main parts: a fixed assembly UF comprising particularly a central computer $P_0$, and a mobile assembly driven with a rotary movement $\omega$: UM. This latter assembly comprises peripheral members similar to those of FIG. 1: $P_1$ to $P_i$.

The index i being variable from 1 to n, n being equal to 12 in the example described with reference to FIG. 1. The connection system properly speaking is itself divided into three main parts:

connecting fibers $F_1$ to $F_i$ in the mobile assembly UM and $FE_0$ and $FR_0$ in the fixed assembly;

mixing fibers, respectively $Fc_2$ and $Fc_1$;

and a rotary optical joint CT.

The connection achieved by the system of the invention is alternatingly bidirectional between the central unit $P_0$ and the peripheral units $P_i$. The information emitted by transmitter $E_0$ of the central unit $P_0$ may be transmitted simultaneously to all the secondary terminals or peripheral units $P_i$ and detected by the receivers $R_i$.

The information emitted by each peripheral unit $P_i$ may be transmitted in shared time by means of transmitter $E_i$ to the central unit $P_0$ and detected by receiver $R_0$. When two peripheral units wish to communicate between themselves, they may do so by passing through the central unit $P_0$. This may be accomplished for example by associating a buffer memory with the central unit $P_0$, using for example the well known so-called "mailbox" techniques or any other process which is outside the scope of the invention.

The arrangements selected for implementing the optical connection system of the invention contribute to the creation of a structure minimizing the energy losses and allow an optimized distribution of the electronic circuits between the central unit $P_0$ and the peripheral units $P_i$. In particular, the high flow achieved by the optical connections allows the use of a bidirectional transmission path of an asymmetric type, instead of two separate unidirectional connections.

Before describing in more detail the arrangements used in the invention, it seems worth while recalling the principal laws ruling the optical phenomena put to use in the invention.

If Pu(E) is the power emitted by a radiating energy source (for example a semiconductor laser) and if, in the optical path followed by the emitted light, are disposed several optical fibers connected in cascade, the power received by a receiver Pu(R) (for example a photodetecting diode) is defined by the relationship:

$$Pu(R) = k\tau \frac{Pu(E)}{N} \qquad (1)$$

where

N is the number of secondary optical fibers (for example $F_i$ in FIG. 2) in parallel emerging from a main fiber (for example $Fc_2$);

k ($<1$) is a factor taking into account the coupling losses at the interfaces;

$\tau$ is the filling rate at the interface of two optical fibers in cascade. For example at interface $Fc_2/F_i$, the filling rate is defined by the relationship:

$$\tau_1(Fc_2/F_i) = \frac{\text{sums of the areas of the cores of the } F_i}{\text{area of the core of } Fc_2} \qquad (2)$$

To effect the energy evaluation, the powers emitted and the coupling losses may be expressed in decibels which can be added algebraically.

Conventionally, an optical emitted power of 1 mW corresponds to 0 dBm (3)

The arrangements used within the scope of the invention will now be described in more detail.

The first arrangement concerns the relative numerical apertures (O.N.) of the different optical fibers disposed in the optical path, not only in the ascending direction ($P_0 \rightarrow P_i$) but also in the descending direction ($P_i \rightarrow P_0$).

It should be recalled that the numerical aperature is defined by the relationship:

$$O.N. = n_1^2 - n_2^2 \quad (4)$$

where $n_1$ and $n_2$ are the respective refraction indices of the central part and of the peripheral part of an optical fiber.

To reduce coupling losses, it is desirable to choose:

$$O.N. (F_i) = O.N. (Fc_2) = (Fc_1) \quad (5)$$

$$O.N. (FE_0) \leqq O.N. (Fc_1) \quad (6)$$

$$O.N. (FR_O) \leqq O.N. (Fc_1) \quad (7)$$

The second arrangement concerns the rotary joint and the mixing fiber. The purely electrical solution described with reference to FIG. 1, imposes a multipath ring collector because of the small flow allowed by the electrical connections. On the contrary, the high-flow optical connections (10 Mbit/s) allow multiplexing in time and the use of a single mixing fiber. The optical rotary joint is situated according to the invention on the mixing fiber, i.e. at the level of the optical channel of larger section so as to increase the mechanical tolerances and, therefore, to reduce the intensity variations due to the rotation.

This rotary joint may be of the type illustrated in FIG. 3. This rotary joint comprises a male end-piece 1 and a female end-piece 3 adapted to form a shaft 4 rotating in a sleeve 5 with a specific fit, a stop device 6-61 and 7-71 delimiting the axial movement of the sleeve, means 8 and 9 for centering the ends of the optical mixing fibers $Fc_1$, $Fc_2$ and means for fixing to the outer bodies formed, on the one hand, by means of a fixed plate 14, included for example in the frame of the central unit $P_0$ and, on the other hand, by means of shaft 2 driving the mobile part of the antenna. These fixing means from respectively a rigid 10 and semi-rigid 11, 12 and 13 coupling. This rotary joint only ensures the rotary optical junction with axis Δ between the central unit $P_0$ integral with the fixed part UF of the antenna and the mobile part UM of the antenna. Additional means not shown provide mechanical coupling between drive shaft 2 and the fixed part UM of the antenna. It is these means which must in particular support the weight of the aerial and its drive shaft 2. These means also ensure distribution, by means of ring collectors, of the electrical power signals required for the proper operation of the antenna.

The mixing fiber may be formed by a multipath coupler of any appropriate type and, by way of non-limiting example, by the multipath coupler for optical connections proposed in U.S. Pat. No. 4,193,661; a coupler in which will be inserted the rotary optical joint which has just been described by dividing the optical fiber into two parts, the first part $Fc_1$ being situated in the fixed unit UF and the second part $Fc_2$ in the mobile unit UM comprising the peripheral units $P_i$. The assembly forms an optical-beam shunting-mixing device.

Furthermore, the efficiency of such a mixing fiber is greatly improved when it is very long. This condition is in general difficult to achieve when the coupler must be used as a discrete component, in the form of a reduced-size module.

Within the scope of the invention, location of the mixing fiber in the optical connection system and its use as a single bidirectional main connection channel imposes no restriction as to its length. The interfaces $Fc_1/FE_0$ and $Fc_1/FR_0$, on the one hand, and the multiple interface $Fc_2/F_i$ on the other hand, may be disposed respectively in the immediate vicinity of the central unit $P_0$ and the assembly of peripheral units $P_i$.

The third and last arrangement concerns the optical connection fibers and the active components coupled the these fibers, i.e. the transmitting and/or receiving components. We may consider that the optical emitted by the fixed central unit $P_0$ is not limited. In fact, all the energy which may be needed is available without restriction of volume. Furthermore, two distinct components are used as transmitter $E_0$ and as receiver $R_0$. $E_0$ may be a semiconductor laser and, as non-limiting example, the semiconductor laser source described in French patent application No. 78.14 762, filed on 18 May 1978 in the name of the applicant and published under the No. 2426347. $R_0$ may be a silicon photodiode PIN.

In the mobile unit UM it is desirable to use only one optical fiber per peripheral unit which ensures the bidirectional connection between a peripheral unit $P_i$ and the mixing fiber $Fc_2$. This fiber is coupled to a component $E_i/R_i$ capable of operating alternatively as an emitter and a detector of light of the same wavelength. This component is preferably a semiconductor diode described in U.S. Pat. No. 4,202,000 concerning a semiconductor diode which, forwardly biased, emits light and which, reverse biased, is capable of detecting light. This particular arrangement also allows the optical power recieved to be doubled with respect to the solution consisting in using a separate light emitter and receiver, as well as two optical fibers per peripheral unit $P_i$.

Considering the respective brilliance of the emitters considered, the coupling between the fixed central unit $P_0$ and the mixing fiber $Fc_1$ may be provided according to two variations.

In the first variation, the coupler may be of the asymmetrical passive type, formed by two branches of different sections, such as illustrated in FIGS. 4 and 5. The emitting fiber $FE_0$ has an effective section $SE_0$. The receiving fiber $FR_0$ has an effective section $SR_0$. The two sections are such that $SE_0 < SR_0$. The area of the photodiode $R_0$ ) not shown) must be greater than or equal to the section $SR_0$.

In the second variation, with photodiode $R_0$ having an area greater than or equal to the area of the core of the mixing fiber $Fc_1$, this diode is pierced with a central aperture 1 through which fiber $FE_0$ passes, as illustrated in FIG. 6, active zone 10 having an annular structure. Photodiode $R_0$ is then placed directly against the core of mixing fiber $Fc_1$. This diode structure may be obtained by chemical etching to provide the central aperture. Tp provide the ascending path, an emitting fiber $FE_0$ passes through diode $R_0$ at 1 and conveys the light emitted by a laser source $E_0$. This laser source may be formed by the source described in the above-mentioned French patent application. The support for source 2 comprises a groove 3 for positioning the emitting fiber $FE_0$ with relation to the pupil 4 of the laser.

The operational aspects of the present invention will now be discussed in conjunction with an information flow between the central processing unit $P_0$ and a plurality of peripheral processing units $P_i$, which as previously discussed may represent the assembly of computing circuits integral with the rotary part of the antenna as illustrated at FIG. 1 including the unit $P_1$ to $P_{12}$. Using the FIG. 2 as a basis for an operational flow of information, a source $E_0$, which forms part of the central computer $P_0$ of the fixed or stationary assembly UF, outputs a signal to a coupling fiber $FE_0$ which is in turn fed to a mixing fiber portion labeled mixing fiber part 1 and $FC_1$. The interrelationship between the coupling fiber $FE_0$ and the mixing fiber $FC_1$ is shown by way of the embodiments of FIGS. 4 and 6. Basically, however, each of these embodiments provide for a coupling between the coupling fibers and the mixing fibers which mixing fibers are well known and as discussed previously, are formed by a multipath coupler of any appropriate type as for example shown in French Pat. No. 2389150. This coupler is divided into two regions separated by the rotary optical joint such that a first part $FC_1$ is part of the stationary part UF and the second part of the mixing fiber $FC_2$ is part of the rotary part UM. The final signal path concerns the connection between the mixing fiber FC-2 and the peripheral processing units $P_i$ via optical connector fibers $R_i$. This arrangement provides that one optical fiber per peripheral unit is used to insure the bidirectional connection between the peripheral unit $P_i$ and the mixing fiber $FC_2$. The component EI/RI is capable of operating alternately as an emitter and a detector of light of the same wavelength. An example of the component for a preripheral processor unit is the semiconductor diode discussed above in conjunction with French patent 2396419. with the constituent elements of the transmission system of the invention being specified, the energy evaluation may be established by means of Table I taking into account relationships (1) to (7). In the upper part of this table is shown typical data corresponding to a concrete embodiment.

TABLE I

| | | |
|---|---|---|
| N = number of secondary terminals | = | 12 |
| emission/reception diameter of $E_i/R_i$ | = | 200 μm |
| core diameter of a fiber $F_i$ | = | 200 μm |
| numerical aperture of $F_i$, $Fc_1$ and $Fc_2$ | = | 0.26 |
| core diameter of $FE_O$ | = | 100 μm |
| $\tau_1$: filling rate | = | 0.5 |
| $\tau_2$: filling rate | = | 0.8 |
| power emitted by $E_O$ | = | 2 mW (3 dBm) |
| power emitted by $E_i$ | = | 1 mW (0 dBm) |
| sensitivity of $R_1$ and $R_O$ | = | 0.5 A/W |
| Ascending Direction Losses | | |
| loss at coupling $E_O/FE_O$ | = | 3 dB |
| loss at coupling $FE_O/Fc_1$ | = | 1 dB |
| loss at coupling $Fc_1/Fc_2$ | = | 1 dB |
| loss at coupling $Fc_2/F_i$ | = | 1 dB |
| loss at coupling $F_i/R_i$ | = | 0.5 dB |
| separation into N: 12 loss | = | 10.8 dB |
| $\tau_1 = 0.5$ loss | = | 3 dB |
| total losses = | | 20.2 dB |
| Descending Direction Losses | | |
| loss at coupling $E_i/F_i$ (0.26²) | = | 11.7 dB |
| loss at coupling $F_i/Fc_2$ | = | 1 dB |
| loss at coupling $F_2F_c^1$ | = | 1 dB |
| loss at coupling $Fc_1/FR_O$ | = | 1 dB |
| $\tau_2 = 0.8$ | = | 1 dB |
| total losses = | | 15.7 dB |

It can be deduced from this table that the optical power received per peripheral unit $P_i$ is equal to:

$Pu(R_i) = 3 - 20.2 = -17.3$ dBm

Similarly, the optical power detected by the fixed central unit is:

$Pu(R_0) = 0 - 15.7$ dBm.

These optical powers are much greater than the optical powers required for detectors $R_0$ and $R_i$ to obtain an error rate less than $10^{-9}$ for a numerical flow of 10 Mbit/s (margin greater than 10 dB).

The invention is not limited to the embodiments which have just been described and in particular the application of the architecture proposed by the invention is not limited to an electronic sweep antenna. The invention is also applicable to any equipment using a bidirectional connection between, on the one hand, a mobile part (rotary) containing peripheral units and, on the other hand, a fixed part containing a central unit. This central unit may furthermore, comprise several sub-systems connected together. In this field of applications, there may be cited in a nonlimiting way, telemetering in rotary machines.

Finally, although especially advantageous in the field of applications which have just been recalled, the arrangements of the invention may also be used in the field of a bidirectional connection between two fixed systems but one of which is accessible only with difficulty and can only be supplied with energy in a limited way. The asymmetrical nature of the connection proposed by the invention provides a good energy evaluation. It is sufficient to leave out the rotary joint for this application.

What is claimed is:

1. An optical connection system for the bidirectional exchange of data for use with an antenna system having a rotary driven ariel integral with a plurality of peripheral processing units which exchange data with a central fixed processing unit wherein said connection system comprises;

first optical fiber connection means coupled at a first end to a first radiating energy emitting member and a first radiating energy detecting member with each of said first memebers being integral with said central unit;

shunting mixing means coupled at one end to a second end of said first optical connection means; and second optical fiber connection means coupled at one end to a second end of said shunting-mixing means, wherein said second fiber means is coupled at a second end to a second radiating energy emitting member and a second radiating energy detecting member with each of said second members being integral with said peripheral units.

2. The system as claimed in claim 1, wherein the first connecting means comprise two optical fibers, one emitting and the other receiving, forming unidirectional data exchange paths, coupled respectively to a semiconductor laser source, emitting radiating energy and to a photodiode, detecting radiating energy; said laser source and said photodiode forming said first radiating energy emitting and receiving members.

3. The system as claimed in claim 2, wherein, at the interface between said first connection means and said shunting-mixing means, the crosssectional area of the optical fiber coupled to said radiating energy emitting source is less than the cross-sectional area of the optical fiber coupled to said radiating energy detecting photodiode.

4. The system as claimed in claim 1, wherein said first connection means are formd by a single optical fiber forming a unidirectional data exchange path coupled at its first end to a semiconductor laser source emitting radiating energy, and at its second end to said shunting-mixing means; and by a photodiode whose active zone is provided with an annular structure, said photodiode present inside this structure a passage whose inner diameter is equal to or greater than the outer diameter of said optical fiber, single so as to be fitted over this fiber in the vicinity of its second end and coupled without intermediate connecting means to said shunting-mixing means; said laser source and said photodiode forming said frist radiating energy emitting and detecting means.

5. The system as claimed in claim , wherein said second means for connecting by optical fibers comprise a bundle of optical fibers coupled at a first end to the shunting-mixing means, each of said optical fibers forming an exchange path being furthermore coupled at their second end to a semiconductor diode capable of operating as an emitter and a detector of radiating energy of the same wavelength, alternately by reversal of polarity; said semiconductor diodes forming said second light-energy emitting and detecting members.

6. The system as claimed in claim 1, wherein said shunting-mixing means comprise a single mixing optical fiber with circular section for interconnecting said first and second connection means; this optical fiber comprising a central optical waveguide limited by end-faces coupled to said first and second connection means.

7. The system as claimed in claim 6, wherein, with the peripheral units integral furthermore with a frame driven with a rotary movement about an axis ($\Delta$), and with the central unit fixed, said mixing optical fiber is split into two parts coupled to each other by a rotary optical joint with the same axis of rotation.

8. The system as claimed in claim 1, wherein said first connection means comprise first and second optical fibers with respective numerical apertures $O.N\ (FE_0)$ and $O.N\ (FR_0)$, said second connection means comprise a bundle of identical optical fibers, each with a numerical aperture $O.N\ (F_i)$ and said shunting-mixing means are formed by a single mixing optical fiber, split into two parts, with respective numerical apertures $O.N\ (FC_1)$ and $O.N\ (FC_2)$; a system in whch the following relationships are verified;

$$O.N\ (F_i) = O.N\ (FC_2) = O.N\ (FC_1)$$

$$O.N\ (FE_0) \leqq O.N\ (FC_1)$$

$$O.N\ (FR_0) \geqq O.N\ (FC_1)$$

* * * * *